United States Patent [19]

Inui

[11] Patent Number: 4,838,399

[45] Date of Patent: Jun. 13, 1989

[54] GEAR SYNCHRONIZER FOR POWER TRANSMISSION

[75] Inventor: Masaki Inui, Toyota, Japan

[73] Assignee: Toyota Jidosha Kabushiki Kaisha, Aichi, Japan

[21] Appl. No.: 196,551

[22] Filed: May 20, 1988

[30] Foreign Application Priority Data

May 20, 1987 [JP] Japan .................. 62-122781

[51] Int. Cl.$^4$ ............................... F16D 11/00
[52] U.S. Cl. ........................... 192/53 F; 192/53 R; 192/53 C
[58] Field of Search ................ 192/53 F, 53 R, 53 C

[56] References Cited

U.S. PATENT DOCUMENTS

| 2,993,579 | 7/1961 | Altmann | 192/114 |
| 3,175,412 | 3/1965 | Peras | 74/339 |
| 3,414,098 | 12/1968 | Kelbel | 192/53 F |
| 3,934,689 | 1/1976 | Kunz | 192/53 C |
| 4,299,317 | 11/1981 | Katayama | 192/53 F |
| 4,413,715 | 11/1983 | Michael et al. | 192/53 S |
| 4,573,371 | 3/1986 | Akutagawa | 192/53 F |
| 4,625,844 | 12/1986 | Ikemoto et al. | 192/53 F |
| 4,732,247 | 3/1988 | Frost | 192/53 R |
| 4,736,643 | 4/1988 | Richards | 74/339 |
| 4,750,597 | 6/1988 | Ikemoto | 74/339 |

FOREIGN PATENT DOCUMENTS

| 0145388 | 6/1985 | European Pat. Off. . | |
| 1127229 | 4/1962 | Fed. Rep. of Germany | 192/53 F |
| 2118126 | 11/1971 | Fed. Rep. of Germany . | |
| 2331053 | 1/1975 | Fed. Rep. of Germany . | |
| 2808897 | 9/1979 | Fed. Rep. of Germany . | |
| 225867A3 | 8/1985 | Fed. Rep. of Germany . | |
| 870198 | 3/1942 | France . | |
| 680079 | 4/1966 | France . | |
| 2556437 | 6/1985 | France . | |
| 51-48540 | 12/1976 | Japan . | |
| 1137332 | 12/1968 | United Kingdom . | |
| 2048399 | 12/1980 | United Kingdom . | |

Primary Examiner—James T. McCall
Attorney, Agent, or Firm—Oliff & Berridge

[57] ABSTRACT

In a gear synchronizer, a clutch sleeve has internal splines in continual engagement with external splines of a hub member fixed to a shaft and is axially shiftable to be engaged at its internal splines with external splines of a spline piece mounted on a hub portion of a gear member rotatable on the shaft. The gear synchronizer includes a support ring encircling a frustoconical portion integral with the spline piece and having external splines engageable with the internal splines of the clutch sleeve, a synchronizer ring coupled with the support ring and having an internal frustoconical surface for frictional engagement with the frustoconical portion of the spline piece, an operation ring coupled with the support and synchronizer rings in such a manner as to be axially displaced in response to relative rotation thereof to the synchronizer ring, a connecting ring rotatably mounted on one side of the hub member and connected to the synchronizer ring, the connecting ring having an external frustoconical surface for frictional engagement with an internal frustoconical surface of the operation ring, and an annular waved spring disposed between the support and operation rings. In shifting operation, the operation ring is brought into frictional engagement with the connecting ring against the waved spring after frictional engagement of the synchronizer ring with the spline piece.

9 Claims, 6 Drawing Sheets

GEAR SYNCHRONIZER FOR POWER TRANSMISSION

BACKGROUND OF THE INVENTION

1. Field of the Invention

The present invention relates to a gear synchronizer for power transmissions, and more particularly, but not exclusively, to a gear synchronizer of the type which comprises a gear member rotatable on a transmission shaft, a hub member mounted on the transmission shaft for rotation therewith and being formed thereon with external splines, a spline piece provided on a hub portion of the gear member for rotation therewith and being formed at one side thereof with a frustoconical portion and thereon with external splines, a clutch sleeve encircling the hub member and having internal splines in continual engagement with the external splines of the hub member, the clutch sleeve being axially shiftable to be engaged at the internal splines thereof with the external splines of the spline piece, a synchronizer ring mounted on the frustoconical portion of the spline piece for frictional engagement therewith, and a plurality of circumferentially spaced strut keys assembled with the inner circumference of the clutch sleeve and loaded radially outwardly into engagement with the clutch sleeve to abut against and urge the synchronizer ring toward the spline piece in a shifting operation of the clutch sleeve.

2. Description of the Prior Art

In U.S. Pat. No. 4,413,715 issued on Nov. 8, 1983, there has been proposed such a gear synchronizer of the Borg-Warner type as described above, wherein the clutch sleeve is axially shifted by a manual shift lever connected thereto to abut the strut keys against the synchronizer ring and to urge them toward the spline piece for effecting frictional engagement between the synchronizer ring and the spline piece. In such shifting operation of the clutch sleeve, the manual shift lever is loaded by a reaction force applied thereto from the synchronizer ring through the clutch sleeve. In the gear synchronizer, it is desirable to provide a cam mechanism for effecting frictional engagement between the synchronizer ring and the spline piece in shifting operation of the clutch sleeve. The cam mechanism, however, is apt to cause slight frictional engagement between the synchronizer ring and the spline piece in a condition where the clutch sleeve is retained in a neutral position.

SUMMARY OF THE INVENTION

It is, therefore, a primary object of the present invention to provide an improved gear synchronizer wherein the clutch sleeve is not applied with such a reaction force from the sychronizer ring to reduce the operator's effort in shifting.

According to the present invention, the object is attained by providing a gear synchronizer which includes a gear member rotatable on a transmission shaft, a hub member formed thereon with external splines and being mounted on the transmission shaft for rotation therewith, a spline piece formed at one side thereof with a frustoconical portion and thereon with external splines and being provided on a hub portion of the gear member for rotation therewith, a clutch sleeve encircling the hub member and having internal splines in continual engagement with the external splines of the hub member, the clutch sleeve being axially shiftable toward and away from the gear member to be engaged at the internal splines thereof with the external splines of the spline piece, and a plurality of circumferentially spaced strut keys assembled with the inner circumference of the clutch sleeve and loaded radially outwardly into engagement with the clutch sleeve, characterized in that the gear synchronizer further comprises a support ring arranged in surrounding relationship with the frustoconical portion of the spline piece to be thrusted by abutment with the strut keys toward the gear member and having external splines engageable with the internal splines of the clutch sleeve, a synchronizer ring coupled with the support ring and having an internal frustoconical surface for frictional engagement with the frustoconical portion of the spline piece, an operation ring disposed between the support ring and the synchronizer ring and being axially movably coupled with the support ring for rotation therewith and axially movably coupled with the synchronizer ring for relative rotation, the operation ring having an internal frustoconical surface, a connecting ring rotatably mounted on one side of the hub member and connected to the spline piece, the connecting ring having an external frustoconical surface for frictional engagement with the internal frustoconical surface of the operation ring, resilient means disposed between the support and operation rings to bias the support ring for engagement with the synchronizer ring and to bias the operation ring for engagement with the synchronizer ring, and cam means arranged to effect relative axial displacement of the support ring and the operation ring against the biasing force of the resilient means in response to relative rotation between the synchronizer and operation rings.

In a practical embodiment, the connecting ring may be eliminated. In such a case, the hub member is formed at one side thereof with an external frustoconical surface for frictional engagement with the internal frustoconical surface of the operation ring.

BRIEF DESCRIPTION OF THE DRAWINGS

Other objects, features and advantages of the present invention will become more readily apparent from the following detailed description of preferred embodiments thereof when considered with reference to the accompanying drawings, in which.

DESCRIPTION OF THE PREFERRED EMBODIMENTS

Figure 1:
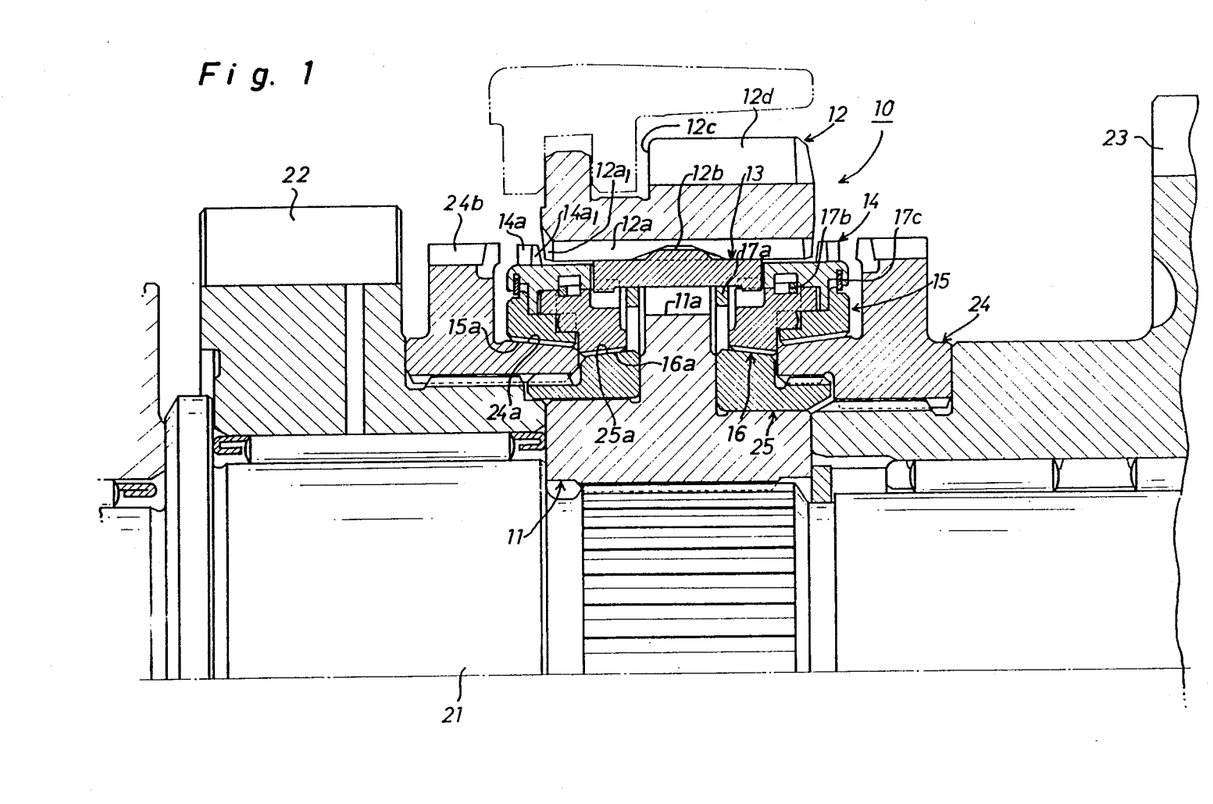
FIG. 1 illustrates in cross-section form one of the circumferentially equi-spaced parts of a gear synchronizer according to the present invention.

Referring now to the drawings, wherein like reference numerals represent the same or corresponding parts throughout the figures, there is illustrated, in FIG. 1, a transmission shaft 21 on which are rotatably supported a pair of axially spaced change-speed gears 22 and 23. Disposed between the change-speed gears 22 and 23 is a pair of synchronizer assemblies 10 which are operable to cause selective speed synchronization between the shaft 21 and the gears 22 and 23, respectively. The synchronizer assemblies have a common hub assembly which includes a hub member 11 fixed to the transmission shaft 21 by means of a spline connection for rotation therewith.

The synchronizer assemblies are arranged to be operated through a clutch sleeve 12 which is connected by a yoke groove 12c to a conventional manual shift mechanism (not shown). The hub member 11 has an outer cylindrical hub portion which is formed thereon with external splines. The clutch sleeve 12 is arranged in surrounding relationship with the hub member 11 and has internal splines 12a in continual engagement with the external splines of hub member 11 and a reverse gear 12d formed thereon. The clutch sleeve 12 is axially shiftable to be engaged at its internal splines 12a with external splines 24b of a spline piece 24. The spline piece 24 is mounted on each hub portion of change-speed gears 22 and 23 by means of a spline connection for rotation therewith. The spline pieces 24 are each formed at one side thereof with a frustoconical portion 24a.

In this embodiment, the outer cylindrical hub portion of hub member 11 has axial recesses in circumferentially equally spaced portions. As shown in FIG. 1, the axially recessed portions each are formed as an axial groove 11a. Disposed within each of the axial grooves 11a is a strut key 13 which is radially outwardly loaded by a pair of axially spaced annular springs 17a attached thereto and supported in engagement with a corresponding recess 12b of clutch sleeve 12 under the load of springs 17a. The right-hand synchronizer assembly is substantially the same as the left-hand synchronizer assembly such that a detailed description of the left-hand synchronizer assembly only is believed necessary. The left-hand synchronizer assembly includes a support ring 14 arranged in surrounding relationship with the frustoconical portion 24a of spline piece 24, a synchronizer ring 15 coupled with the support ring 14 for frictional engagement with the frustoconical portion 24a of spline piece 24, an operation ring 16 coupled with the support ring 14 and synchronizer ring 15, and an annular waved spring 17b disposed between the support ring 14 and operation ring 16.

Figure 2:
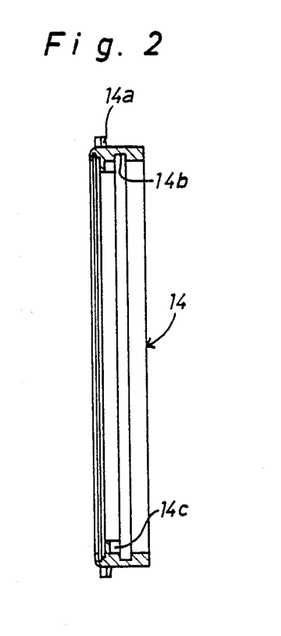
FIG. 2 is a cross-sectional view of a support ring shown in FIG. 1.
Figure 3:
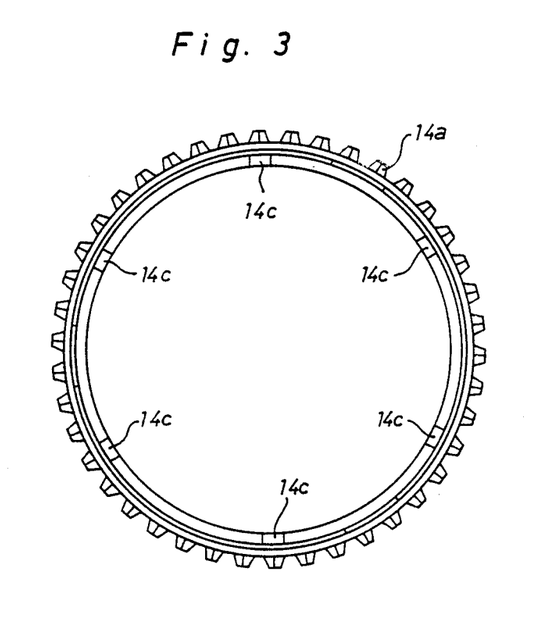
FIG. 3 is a front view of the support ring shown in FIG. 2.
Figure 4:
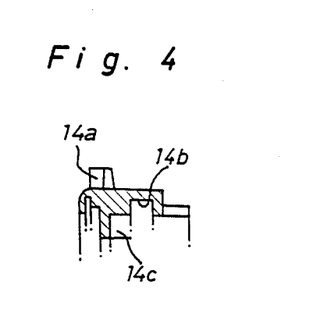
FIG. 4 is an enlarged cross-sectional view of a portion of the support ring shown in FIG. 2.
Figures 5, 6:
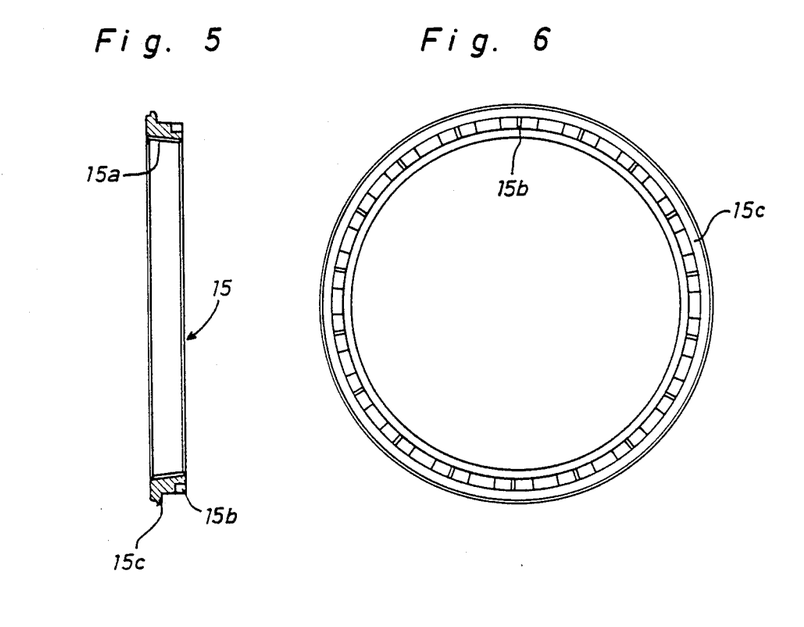
FIG. 5 is a cross-sectional view of the synchronizer ring shown in FIG. 1.
FIG. 6 is a front view of the synchronizer ring shown in FIG. 5.
Figure 7:
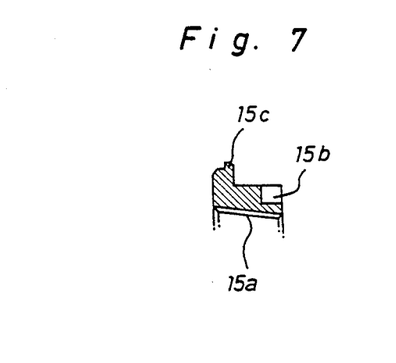
FIG. 7 is an enlarged cross-sectional view of a portion of the synchronizer ring shown in FIG. 5.
Figure 11:
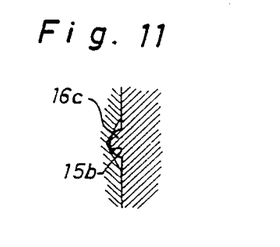
FIG. 11 is a sectional view illustrating a cam mechanism of the synchronizer ring.

As shown in FIGS. 2 to 4, the support ring 14 is integrally formed at its outer periphery with external splines 14a of small length and at its inner periphery with an annular groove 14b and a plurality of circumferentially equally spaced radial recesses 14c. As shown in FIGS. 5 to 7, the synchronizer ring 15 has an internal frustoconical surface 15a for frictional engagement with the frustoconical portion 24a of spline piece 24 and is integrally formed at its outer periphery with a plurality of circumferentially equally spaced cam grooves 15b and an annular projection 15c. As shown in FIG. 11, the cam grooves 15b each are in the form of a V-groove having a pair of inclined cam surfaces. In a condition where the synchronizer ring 15 has been coupled with the support ring 14 as shown in FIG. 1, the synchronizer ring 15 is retained in position by a snap-ring 17c which is coupled within an internal annular groove of support ring 14 and engaged with the external annular projection 15c of synchronizer ring 15.

Figure 8:
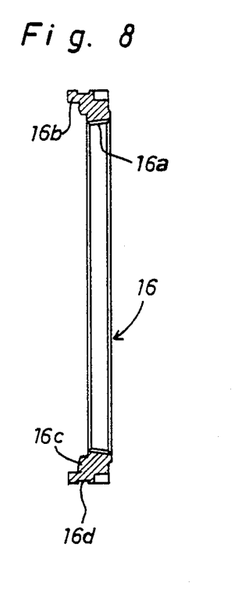
FIG. 8 is a cross-sectional view of an operation ring shown in FIG. 1.
Figure 9:
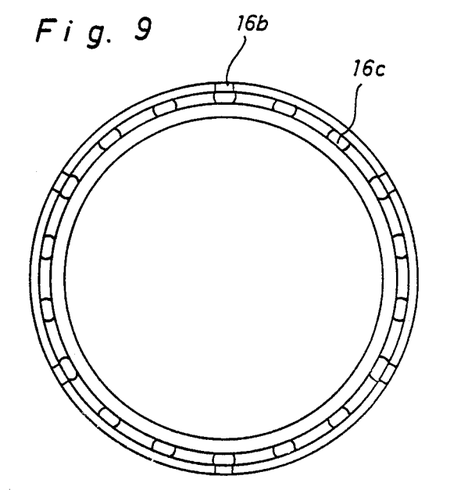
FIG. 9 is a front view of the operation ring shown in FIG. 8.
Figure 10:
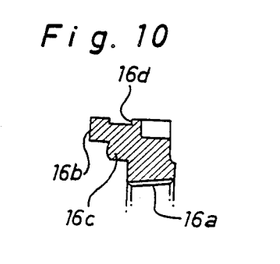
FIG. 10 is an enlarged cross-sectional view of a portion of the operation ring shown in FIG. 8.

As shown in FIGS. 8 to 10, the operation ring 16 is integrally formed at its inner periphery with an internal frustoconical surface 16a and at its one side with a plurality of circumferentially equally spaced axial projections 16b and a plurality of circumferentially equally spaced cam projections 16c. The operation ring 16 is further formed at its outer periphery with an external annular groove 16d. In a condition where the operation ring 16 has been coupled with the support ring 14 and synchronizer ring 15 as shown in FIG. 1, the axial projections 16b of ring 16 are engaged with the radial recesses 14c of support ring 14 in such a manner as to permit relative displacement of the support and operation rings 14 and 16 in an axial direction, and the cam projections 16c of ring 16 are engaged with the cam grooves 15b of synchronizer ring 15 in such a manner as to permit relative rotation of the synchronizer and operation rings 15 and 16. Disposed within an annular space between the grooves 14b and 16d of respective rings 14 and 16 is the annular waved spring 17b which acts to position the support and operation rings 14 and 16 in an axial direction.

As shown in FIG. 11, the cam projections 16c of ring 16 are each formed with a semicircular cam surface which is in contact with the inclined cam surfaces of the corresponding cam grooves 15b under the load of waved spring 17b. When relative rotation of the synchronizer ring 15 and operation ring 16 is caused by shifting operation of the clutch sleeve 12, the cam projections 16c of ring 16 cooperate with the cam grooves 15b of ring 15 to effect relative displacement of rings 15 and 16 in the axial direction against the biasing force of waved spring 17b. In the above-described condition, the external splines 14a of support ring 14 and the external splines 24b of spline piece 24 are arranged to be engaged with the internal splines 12a of clutch sleeve 12 during a shifting operation, and the support ring 14 is positioned to abut against the strut keys 13. As shown in FIG. 1, the left-hand synchronizer assembly further includes a connecting ring 25 which is rotatably mounted on one side of the hub member 11 and connected with the spline piece 24 by means of a spline connection for rotation therewith. The connecting ring 25 has an external frustoconical surface 25a for frictional engagement with the internal frustoconical surface 16a of operation ring 16.

When that the clutch sleeve 12 is shifted to the left by the operator to engage the change-speed gear 22 to the transmission shaft 21, the strut keys 13 will move with the clutch sleeve 12 to abut against and urge the support ring 14 toward the synchronizer ring 15 which will bring the internal frustoconical surface 15a of synchronizer ring 15 into frictional engagement with the frustoconical portion 24a of spline piece 24. At this initial stage, the operation ring 16 rotates with the support ring 14 to cause relative rotation between the synchronizer ring 15 and operation ring 16, and the chamfers 12a, of internal splines 12a of clutch sleeve 12 are brought into engagement with chamfers 14a₁ of external splines 14a of support ring 14. As a result, the cam projections 16c of operation ring 16 cooperate with the cam grooves 15b of synchronizer ring 15 to effect relative axial displacement of rings 15 and 16 against the biasing force of waved spring 17b. This causes frictional engagement of the internal frustoconical surface 16a of operation ring 16 with the external frustoconical surface 25a of connecting ring 25. Under this condition, the operator's effort applied to clutch sleeve 12 is transmitted as a synchronous torque to the spline piece 24 through the support ring 14 and synchronizer ring 15 and is further transmitted as a synchronous torque to the spline piece 24 through the support ring 14, operation ring 16 and connecting ring 25. Thus, synchronism between the relatively rotating parts is established such that the internal splines 12a of clutch sleeve 12 are smoothly engaged with the external splines 24b of spline piece 24.

Figure 12:
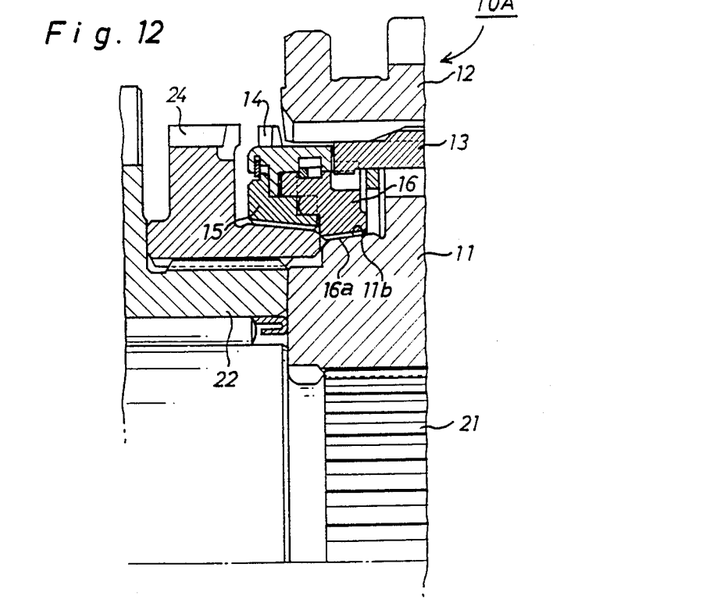
FIG. 12 illustrates in cross-sectional form a modification of the gear synchronizer shown in FIG. 1.

From the above description, it will be understood that the operation ring 16 and connecting ring 25 act to noticeably increase the synchronous capacity of the gear synchronizer and to apply therethrough a reaction force acting on the support ring 14 and synchronizer ring 15 to the hub member 11 thereby to reduce the operator's effort in shifting operation. In a practical embodiment, the gear synchronizer may be modified as illustrated in FIG. 12, wherein the external frustoconical surface 25a of connecting ring 25 is replaced with an external frustoconical surface 11b formed on the one side of hub member 11 for frictional engagement with the internal frustoconical surface 16a of operation ring 16. In this modification 10A, the operation ring 16 acts to apply therethrough the reaction force acting on the support ring 14 and synchronizer ring 15 to the hub member 11 thereby to reduce the operator's effort in shifting. The synchronous torque, however, is applied to the spline piece 24 only through the support ring 14 and synchronizer ring 15.

Figure 13:
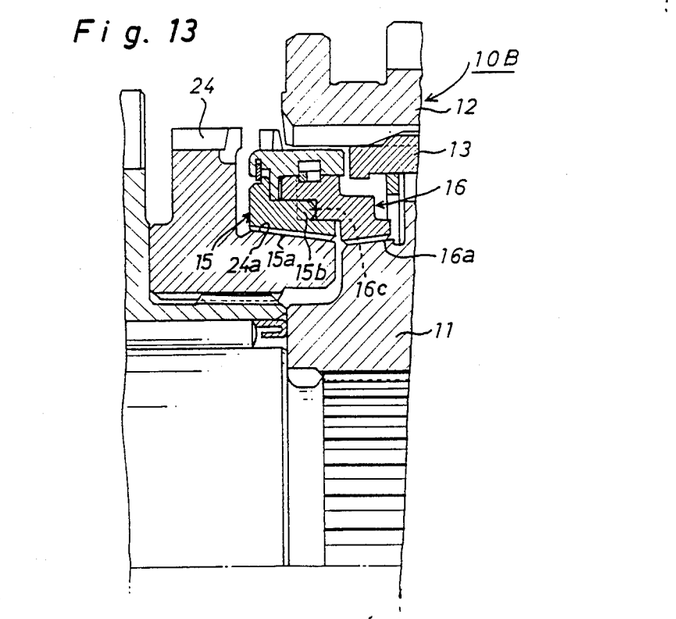
FIG. 13 illustrates in cross-sectional form another modification of the gear synchronizer shown in FIG. 1.
Figure 14:
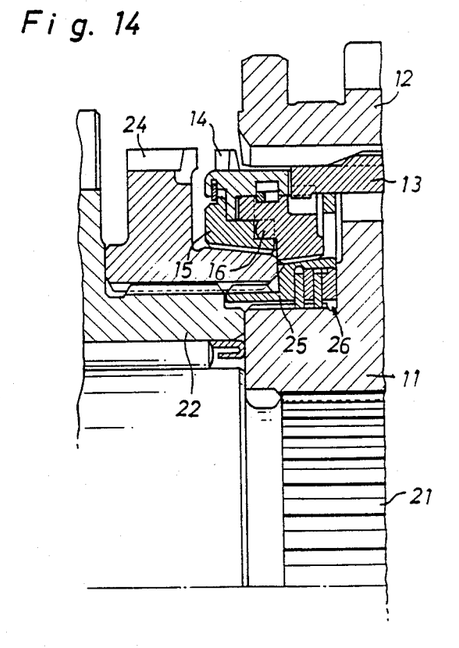
FIG. 14 illustrates in cross-sectional form a further modification of the gear synchronizer shown in FIG. 1.

In FIG. 13 there is illustrated another modification 10B of the gear synchronizer, wherein the internal frustoconical surface 16a of operation ring 16 is formed substantially the same in diameter as the internal frustoconical surface 15a of synchronizer ring 15, and wherein there is provided relatively large spacing between the respective inner end faces of synchronizer ring 15 and spline piece 24 and the respective outer end faces of operation ring 16 and hub member 11. In this modification 10B, the spacing is useful to prevent rotation of the synchronizer ring 15 and operation ring 16 with the spline piece 24 caused by engagement therewith in a condition where the clutch sleeve 12 is retained in a neutral position. Furthermore, the gear synchronizer may be modified as illustrated in FIG. 14, wherein a plurality of interleaved frictional clutch plates 26 are disposed between the connecting ring 25 and hub member 11.

While the invention has been described in conjunction with certain preferred embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A gear synchronizer comprising a gear member rotatable on a transmission shaft, a hub member formed thereon with external splines and being mounted on said transmission shaft for rotation wherewith, a spline piece formed at one side thereof with a frustoconical portion and thereon with external splines and being provided on a hub portion of said gear member for rotation therewith, a clutch sleeve encircling said hub member and having internal splines in continual engagement with the external splines of said hub member, said clutch sleeve being axially shiftable toward and away from said gear member to be engaged at the internal splines thereof with the external splines of said spline piece, a plurality of circumferentially spaced strut keys assembled with the inner circumference of said clutch sleeve and loaded radially outwardly into engagement with said clutch sleeve, a support ring arranged in surrounding relationship with the frustoconical portion of said spline piece to be thrusted by abutment with said strut keys toward said gear member and having external splines engageable with the internal splines of said clutch sleeve;

a synchronizer ring coupled with said support ring and having an internal frustoconical surface for frictional engagement with the frustoconical portion of said spline piece;

an operation ring disposed between said support and synchronizer rings and being axially movably coupled with said support ring for rotation therewith and axially movably coupled with said synchronizer ring for relative rotation, said operation ring having an internal frustoconical surface;

a connecting ring rotatably mounted on one side of said hub member and connected to said spline piece, said connecting ring having an external frustoconical surface for frictional engagement with the internal frustoconical surface of said operation ring;

resilient means disposed between said support and operation rings to bias said support ring for engagement with said synchronizer ring and to bias said operation ring for engagement with said synchronizer ring; and cam means arranged to effect relative axial displacement of said support and operation rings against the biasing force of said resilient means in response to relative rotation between said synchronizer and operation rings.

2. A gear synchronizer as claimed in claim 1, wherein said support ring is formed at an inner periphery thereof with a plurality of circumferentially spaced radial recesses, and said operation ring is formed at one side thereof with a plurality of circumferentially spaced axial projections which are engaged with the radial recesses of said support ring in such a manner as to permit axial movement of said operation ring.

3. A gear synchronizer as claimed in claim 1, wherein said support ring is formed at an inner periphery thereof with an annular groove, and said operation ring is formed at an outer periphery thereof with an annular groove which corresponds with the annular groove of said support ring to form an annular space therebetween, and wherein said resilient means is in the form of an annular waved spring disposed within the annular space between said support and operation rings.

4. A gear synchronizer as claimed in claim 1, wherein said cam means comprises a plurality of circumferentially spaced cam grooves formed in an outer periphery of said synchronizer ring, and a plurality of circumferentially spaced cam projections formed on one side of said operation ring and being engaged with the cam grooves of said synchronizer ring under the biasing force of said resilient means.

5. A gear synchronizer as claimed in claim 1, further comprising a frictional clutch mechanism disposed between said connecting ring and said hub member.

6. A gear synchronizer comprising a gear member rotatable on a transmission shaft, a hub member formed thereon with external splines and being mounted on said transmission shaft for rotation therewith, a spline piece formed at one side thereof with a frustoconical portion and thereon with external splines and being provided on a hub portion of said gear member for rotation therewith, a clutch sleeve encircling said hub member and having internal splines in continual engagement with the external splines of said hub member, said clutch sleeve being axially shiftable toward and away from said gear member to be engaged at the internal splines thereof with the external splines of said spline piece, a plurality of circumferentially spaced strut keys assembled with the inner circumference of said clutch sleeve and loaded radially outwardly into engagement with said clutch sleeve,

- a support ring arranged in surrounding relationship with the frustoconical portion of said spline piece to be thrusted by abutment with said strut keys toward said gear member and having external splines engageable with the internal splines of said clutch sleeve;
- a synchronizer ring coupled with said support ring and having an internal frustoconical surface for frictional engagement with the frustoconical portion of said spline piece;
- an operation ring disposed between said support and synchronizer rings and being axially movably coupled with said support ring for rotation therewith and axially movably coupled with said synchronizer ring for relative rotation, said operation ring having an internal frustoconical surface for frictional engagement with an external frustoconical surface formed on one side of said hub member;
- resilient means disposed between said support and operation rings to bias said support ring for engagement with said synchronizer ring and to bias said operation ring for engagement with said synchronizer ring; and
- cam means arranged to effect relative axial displacement of said support and operation rings against the biasing force of said resilient means in response to relative rotation between said synchronizer and operation rings.

7. A gear synchronizer as claimed in claim 6, wherein said support ring is formed at an inner periphery thereof with a plurality of circumferentially spaced radial recesses, and said operation ring is formed at one side thereof with a plurality of circumferentially spaced axial projections which are engaged with the radial recesses of said support ring in such a manner as to permit axial movement of said operation ring.

8. A gear synchronizer as claimed in claim 6, wherein said support ring is formed at an inner periphery thereof with an annular groove, and said operation ring is formed at an outer periphery thereof with an annular groove which corresponds with the annular groove of said support ring to form an annular space therebetween, and wherein said resilient means is in the form of an annular waved spring disposed within the annular space between said support and operation rings.

9. A gear synchronizer as claimed in claim 6, wherein said cam means comprises a plurality of circumferentially spaced cam grooves formed in an outer periphery of said synchronizer ring, and a plurality of circumferentially spaced cam projections formed on one side of said operation ring and being engaged with the cam grooves of said synchronizer ring under the biasing force of said resilient means.

* * * * *